US009690682B2

(12) United States Patent
Kuroda et al.

(10) Patent No.: US 9,690,682 B2
(45) Date of Patent: Jun. 27, 2017

(54) PROGRAM INFORMATION GENERATING SYSTEM, METHOD, AND COMPUTER PROGRAM PRODUCT

(71) Applicant: Kabushiki Kaisha Toshiba, Minato-ku (JP)

(72) Inventors: Akira Kuroda, Yokohama (JP); Yohei Hasegawa, Kawasaki (JP); Hidenori Matsuzaki, Fuchu (JP); Nobuaki Tojo, Tachikawa (JP); Mayuko Koezuka, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/718,485

(22) Filed: May 21, 2015

(65) Prior Publication Data

US 2016/0062871 A1 Mar. 3, 2016

(30) Foreign Application Priority Data

Aug. 26, 2014 (JP) .................................. 2014-171995

(51) Int. Cl.
*G06F 11/30* (2006.01)
*G06F 9/44* (2006.01)

(52) U.S. Cl.
CPC ................................... *G06F 11/30* (2013.01)

(58) Field of Classification Search
None
See application file for complete search history.

(56) References Cited

U.S. PATENT DOCUMENTS

| | | | |
|---|---|---|---|
| 7,698,686 B2 | 4/2010 | Carroll et al. | |
| 2006/0248401 A1* | 11/2006 | Carroll ................ | G06F 11/3423 714/38.1 |
| 2007/0162903 A1* | 7/2007 | Babb, II .................... | G06F 8/75 717/154 |
| 2007/0168992 A1* | 7/2007 | Bates .................. | G06F 11/3644 717/128 |
| 2009/0138862 A1* | 5/2009 | Tanabe .................... | G06F 8/456 717/149 |
| 2012/0023482 A1* | 1/2012 | Welchman .......... | G06F 11/3676 717/125 |
| 2015/0026702 A1 | 1/2015 | Kuroda et al. | |
| 2015/0113509 A1* | 4/2015 | Faraj ..................... | G06F 11/079 717/124 |

FOREIGN PATENT DOCUMENTS

| | | |
|---|---|---|
| JP | 2015-43197 A | 3/2015 |
| JP | 2015-167002 A | 9/2015 |

* cited by examiner

*Primary Examiner* — Daxin Wu
(74) *Attorney, Agent, or Firm* — Oblon, McClelland, Maier & Neustadt, L.L.P.

(57) ABSTRACT

A program information generating system includes an acquisition unit that acquires dependency information indicating dependency among a plurality of events generated by execution of a program and selection information identifying a selected event that is the event selected by a user; a generation unit that generates display information, on the basis of the dependency information and the selection information, such that a dependency path that is formed of the plurality of events having the dependency and includes the selected event is displayed in a distinguishable manner; and a display control unit that controls a display unit, on the basis of the display information, such that a display image indicating an execution state of the program is displayed.

20 Claims, 15 Drawing Sheets

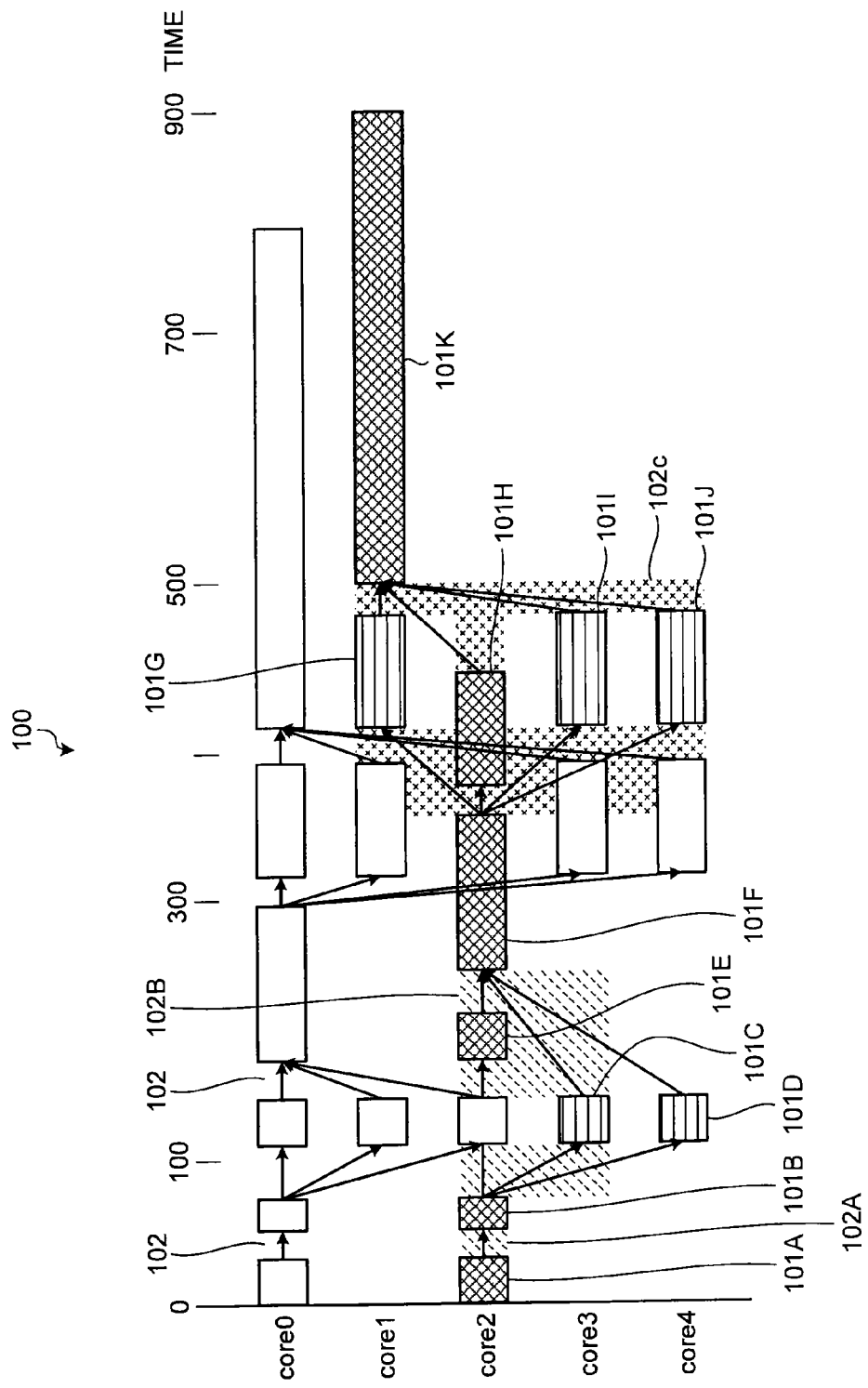

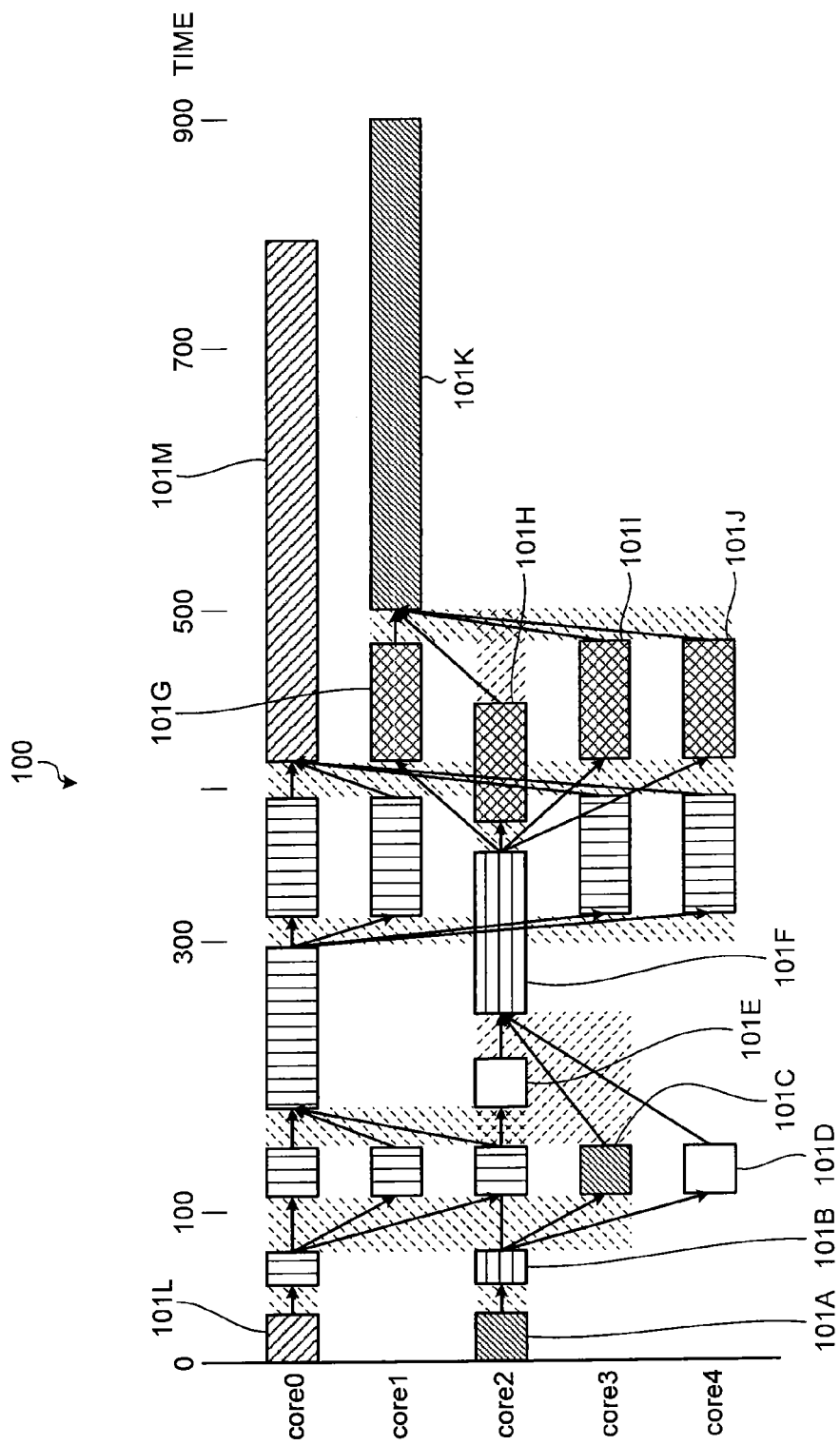

PROGRAM INFORMATION GENERATING SYSTEM, METHOD, AND COMPUTER PROGRAM PRODUCT

CROSS-REFERENCE TO RELATED APPLICATION

This application is based upon and claims the benefit of priority from Japanese Patent Application No. 2014-171995, filed on Aug. 26, 2014; the entire contents of which are incorporated herein by reference.

FIELD

Embodiments described herein relate generally to program information generating system, method, and program that generate information indicating an execution state of a program.

BACKGROUND

A support tool that allows one to objectively grasp an execution state of a program is used in a program development or the like. There is an apparatus which generates an image indicating the execution state of a program and provides the image to a user through a display of a computer, for example. Such apparatus is adapted to display a region indicating an activity of all execution states of the program and a region indicating a detailed execution state of a specific range, where the user can designate the specific range from the region indicating all the execution states.

There is however a case that, in using the aforementioned support tool of the related art, the image indicating the execution state becomes complex when, for example, a large number of events are generated by executing the program, thereby making it difficult to obtain necessary information from the image.

BRIEF DESCRIPTION OF THE DRAWINGS

FIG. 6 is a diagram illustrating dependency information;
FIG. 7 is a diagram illustrating selection information;
FIG. 8 is a diagram illustrating specific event information;
FIG. 18 is a diagram illustrating the display image when a display mode of an event object corresponding to a specific event constituting a critical path is changed;
and
FIG. 19 is a diagram illustrating the display image when two event objects not included in a dependency path that is already set are newly selected.

DETAILED DESCRIPTION

According to one embodiment, a program information generating system includes an acquisition unit, a generation unit, and display control unit. The acquisition unit acquires dependency information indicating dependency among a plurality of events generated by execution of a program and selection information identifying a selected event that is the event selected by a user. The generation unit generates display information, on the basis of the dependency information and the selection information, such that a dependency path that is formed of the plurality of events having the dependency and includes the selected event is displayed in a distinguishable manner. The display control unit controls a display unit, on the basis of the display information, such that a display image indicating an execution state of the program is displayed.

First Embodiment

Figure 1:
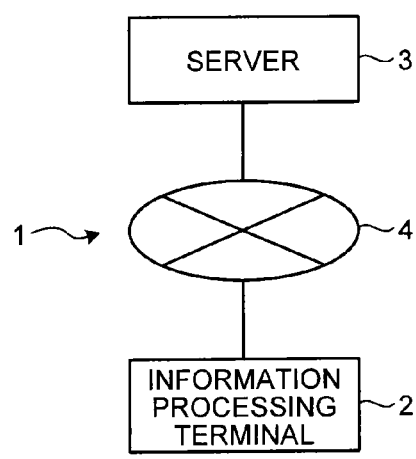
FIG. 1 is a diagram illustrating a configuration of a program information generating system according to a first embodiment.

FIG. 1 is a diagram illustrating a configuration of a program information generating system 1 according to a first embodiment. The program information generating system 1 includes an information processing terminal 2 and a server 3. The information processing terminal 2 and the server 3 are connected to each other via a network 4 such as the Internet. The information processing terminal 2 is an information processing apparatus operable by a user and is a personal computer or a tablet, for example. The server 3 performs at least a part of processing that generates an image displayed on the information processing terminal 2. Note that while one information processing terminal 2 and one server 3 are illustrated in FIG. 1, there may be provided a plurality of each of the information processing terminal 2 and the server 3.

Figure 2:
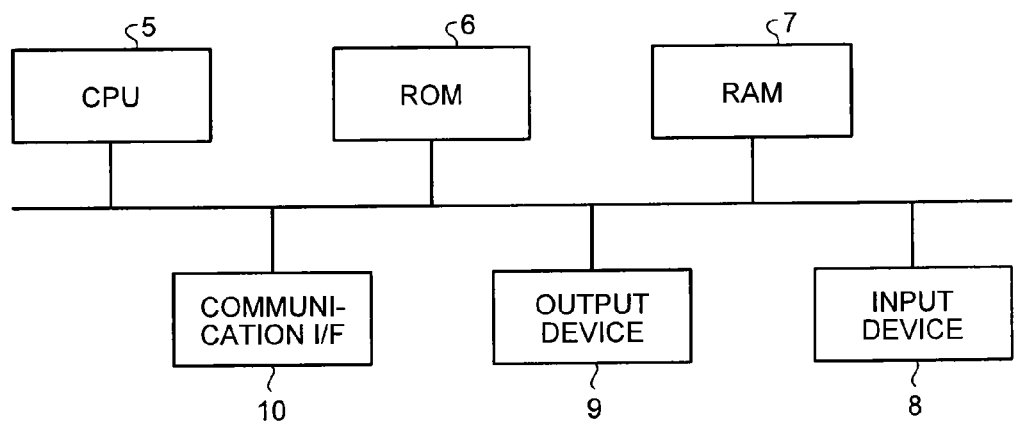
FIG. 2 is a block diagram illustrating a hardware configuration of an information processing terminal and a server.

FIG. 2 is a diagram illustrating a hardware configuration of the information processing terminal 2 and the server 3. The information processing terminal 2 and the server 3 having a configuration employed in a normal computer includes a CPU (Central Processing Unit) 5, a ROM (Read Only Memory) 6, a RAM (Random Access Memory) 7, an input device 8, an output device 9, and a communication I/F 10. The CPU 5 performs predetermined arithmetic processing according to a control program stored in the ROM 6 or the like while using the RAM 7 as a working area. The input device 8 is a device used to input information from outside and is a keyboard, a mouse, and/or a touch panel, for example. The output device 9 is a device used to output information internally generated to the outside, and is a display and/or a printer, for example. The communication I/F 10 is a device which allows information to be transmitted/received to/from an external device through the network 4.

Figure 3:
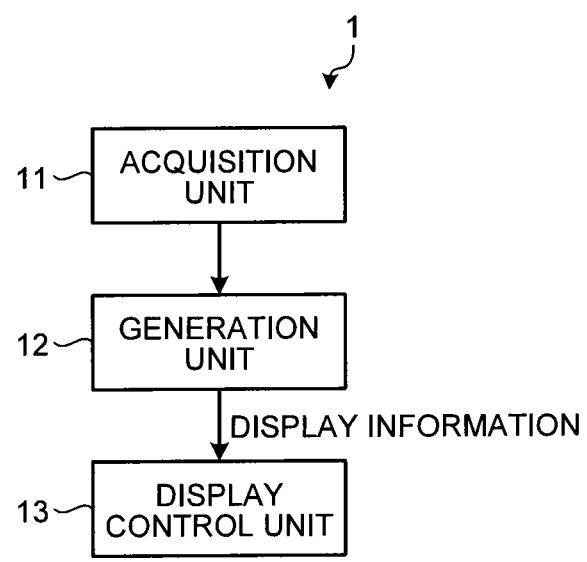
FIG. 3 is a block diagram illustrating a functional configuration of the program information generating system.

FIG. 3 is a block diagram illustrating a functional configuration of the program information generating system 1.

The program information generating system 1 includes an acquisition unit 11, a generation unit 12, and a display control unit 13.

The acquisition unit 11 acquires information required to generate an image indicating an execution state of a program. The program refers to a program to be inspected and is different from the control program provided to control the CPU 5. It is assumed that the expression "program" hereinafter refers to the program to be inspected. The acquisition unit 11 is configured by using the CPU 5, the ROM 6, the RAM 7, the input device 8 and the like of the information processing terminal 2 or the server 3.

The program is a description of an instruction given to the information processing apparatus and is, for example, a source code described in a programming language such as a C language or a JAVA (registered trademark) language. An event occurs when the program is executed. The event is a unit of processing generated by executing the program and includes the following, for example. Note that the event is referred to as a task in some cases. A single event may include a plurality of events as well. There is a case where an "event 1" indicating one-time execution of a function includes, within that execution, a plurality of events indicating memory access and instruction execution, for example.

Element of a program such as a function, a loop, and a conditional branch
  Memory access
  Instruction execution
  Thread creation
  Synchronization processing
  Processing executed by a computational resource such as an electronic circuit FIGS. 4 to 8 illustrate information acquired by the acquisition unit 11. The information includes axis information 50, event information 60, dependency information 70, selection information 80, and specific event information 90.

Figure 4:
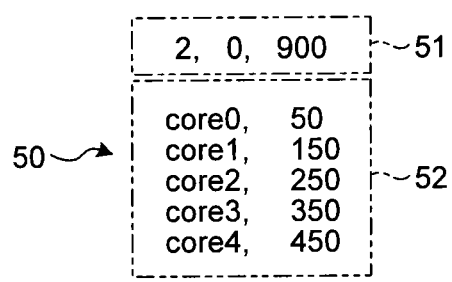
FIG. 4 is a diagram illustrating axis information.

FIG. 4 is a diagram illustrating the axis information 50. The axis information 50 is a piece of information used to set an outline of an image (a display image 100 illustrated in FIGS. 11 to 19 below) indicating an execution state of the program displayed in the output device 9 (such as a display of the information processing terminal 2). The outline is an area required to display the content of the image indicating the execution state of the program and corresponds to the length of each of a vertical axis and a horizontal axis of a rectangular image, for example. The axis information 50 includes time axis information 51 and attribute axis information 52. The time axis information 51 setting the horizontal axis of the display image 100 includes a duration per smallest rendering unit and a rendering duration of the output device 9. It is illustrated in the present example that the duration per smallest rendering unit equals "2" and the rendering duration equals "0" to "900". The attribute axis information 52 setting the vertical axis of the display image 100 includes an element name and a display position. It is illustrated in the present example that five elements from "core0" to "core4" are provided and the display position of "core0" is "50". The element name indicates hardware associated with an event, for example, and indicates a processor core executing the event in the present example. The value "50" indicates a predetermined position in a vertical direction of the output device 9. Note that as opposed to the present example, the attribute axis and the time axis may correspond to the horizontal axis and the vertical axis, respectively.

Figure 5:
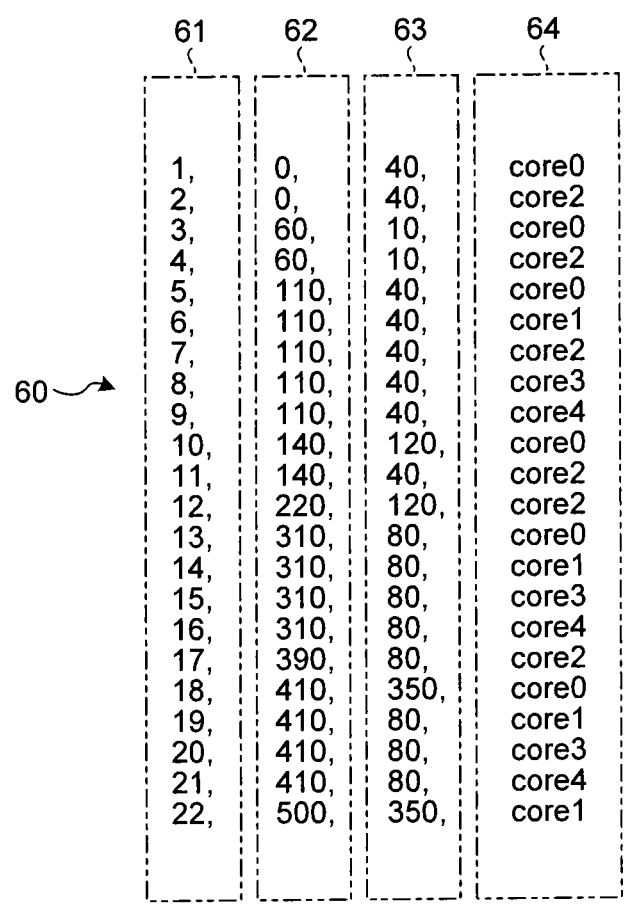
FIG. 5 is a diagram illustrating event information.

FIG. 5 is a diagram illustrating the event information 60. The event information 60 is a piece of information in which information related to an execution time and an attribute is set for each event. The event information 60 includes identification information 61, execution time information (start time information 62 and duration information 63), and attribute information 64. It is illustrated in the present example that an event to which "1" is assigned as the identification information 61 is executed from a time "0" for the duration of "40" by the "core0".

Note that the event information 60 is not limited to what is described above but may also include the following information, for example.
  Execution trace information
  Static information of a program
  Information on execution environment of a program
  Execution information of hardware
  Information indicating whether or not it is an event in a critical path The execution trace information is a piece of information that can be acquired at the time of executing the program and indicates a state of the execution, and includes the following information, for example.
  Information on a processor core executing an event
  Information on a hardware resource executing an event
  Information on an instruction causing the execution of an event
  Information on memory access executed by an event
  The number of function calls executed by an event
  Value of a variable in an event
  Information indicating which round of iteration it is when loop iteration is executed as an event
  Information indicating whether interrupt processing is executed as an event The static information of the program is a piece of information that can be acquired before executing the program and includes the following information, for example.
  Source code of the program
  Static information acquired from a source code management system
  Position information on the source code
  Structural information of the program
  Compile information of the source code
  Version information of the source code
  Information indicating whether the program is a kernel program
  Information indicating whether the program is a user program The information on the execution environment of the program is a piece of information pertaining to an environment when the program is executed and includes the following information, for example.
  Name of the processor core
  Server name
  Hardware information
  Specification information of the server Moreover, the execution time information is not limited to what is described above but may also include the following information, for example.
  Start time and end time
  Duration and end time The start time, the end time, and the duration may also be the following information, for example.

Processor time

Time information generated on the basis of the processor time

Hardware time

Time information generated on the basis of the hardware time

Figures 6, 7, 8:
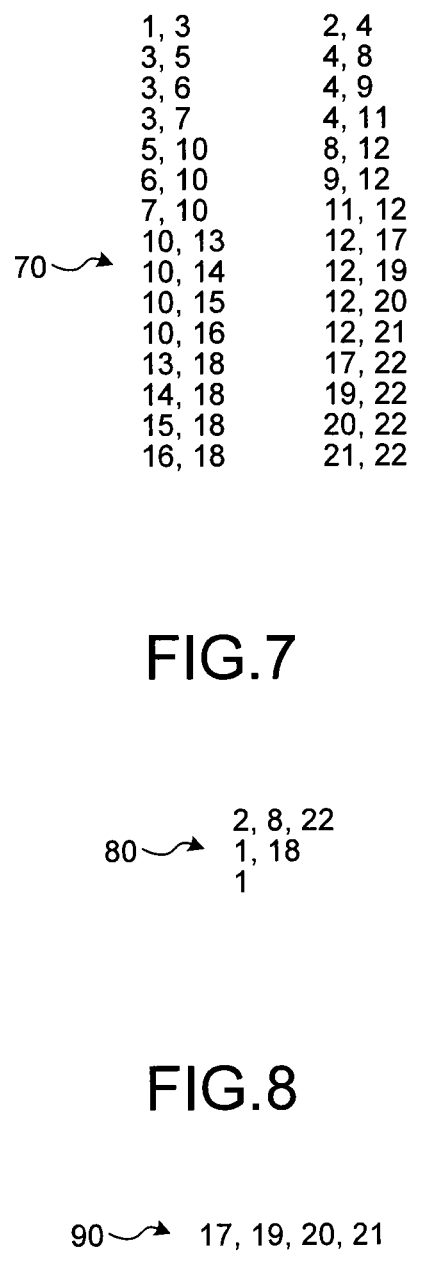

FIG. 6 is a diagram illustrating the dependency information 70. The dependency information 70 is a piece of information identifying events that have dependency on each other. The dependency indicates the order of execution of a plurality of events executed successively. It is illustrated in the present example that "1, 3" means to execute an event "3" after completing an event "1". Moreover, "3, 5", "3, 6", and "3, 7" indicate that events "5, 6, 7" are executed in parallel after completing the event "3". Moreover, "5, 10", "6, 10" and "7, 10" indicate that an event "10" is not executed until all of the events "5, 6, 7" are completed. There are illustrated 30 pieces of dependency in the same manner in the present example.

Note that the dependency information 70 is not limited to what is described above but may include the following information, for example.

Information specifying a dependency source and a dependency destination

Information indicating dependency of data

Information indicating dependency of control

Information indicating the order of use of a hardware resource

FIG. 7 is a diagram illustrating the selection information 80. The selection information 80 is a piece of information identifying an event selected by a user. The event can be selected by the user operating the information processing terminal 2. The event can be selected by using the mouse or touch panel to specify an image indicating the event in the display image 100 (to be described) that is displayed on the display of the information processing terminal 2 or by operating the keyboard to input a number assigned to the event, for example. The event may be selected not only by a manual operation of the user but by automatic selection where an event satisfying a preset condition is selected automatically. The present example illustrates cases where three events "2, 8, 22" are selected, two events "1, 18" are selected, and one event "1" is selected.

FIG. 8 is a diagram illustrating the specific event information 90. The specific event information 90 is a piece of information identifying an event matching a predetermined condition. The predetermined condition is a factor that inhibits smooth execution of a program, for example. It is illustrated in the present example that events "17, 19, 20, 21" satisfy the predetermined condition. The following events correspond to a specific event, for example.

A plurality of events temporally overlapping and executed in parallel

Event constituting a critical path

Event identified on the basis of the execution time information (the start time information 62 and the duration information 63)

Event identified on the basis of the attribute information 64

The critical path is a path that requires the longest time for all events to be completed.

The event identified on the basis of the execution time information includes the following events, for example. These events may be combined as well.

Event with a start time set later than a predetermined time

Event with a start time set earlier than the predetermined time

Event with a start time corresponding with the predetermined time

Event with a start time not corresponding with the predetermined time

Event with an end time set later than a predetermined time

Event with an end time set earlier than the predetermined time

Event with an end time corresponding with the predetermined time

Event with an end time not corresponding with the predetermined time

Event with an execution period longer than a predetermined value

Event with an execution period shorter than the predetermined value

Event with an execution period corresponding with the predetermined value

Event with an execution period not corresponding with the predetermined value

The event identified on the basis of the attribute information 64 includes the following events, for example. These events may be combined as well.

Event identified on the basis of the number of memory accesses performed at the time of execution Event identified on the basis of a memory address of a destination of the memory access at the time of execution Event identified by processing of the CPU such as addition and subtraction Event identified by a location, a range, or the like on the source code Event identified by program configuration information such as a function and a loop Event identified on the basis of a rotation number of the loop Event identified on the basis of information of a core being executed Event identified on the basis of execution information of hardware The aforementioned pieces of information acquired by the acquisition unit 11 is acquired, generated, and stored while using a function of the information processing terminal 2, the server 3, or another information processing apparatus. A method of acquiring, generating, and storing the aforementioned pieces of information is to be designed appropriately according to the configuration, function, and the like of a device and a network used. The program may be acquired from a portable storage medium such as a CD-ROM, a DVD, or a flash memory or through the network 4, for example. Moreover, the information may be input by an input operation of the user, acquired by reading the information stored in advance in a predetermined storage device connected to the network 4, or generated by using a system which automatically analyzes the content of the program. Therefore, the acquisition unit 11 can be configured in various forms as long as it is configured to be able to transfer required information to the generation unit 12 to be described below.

Figure 9:
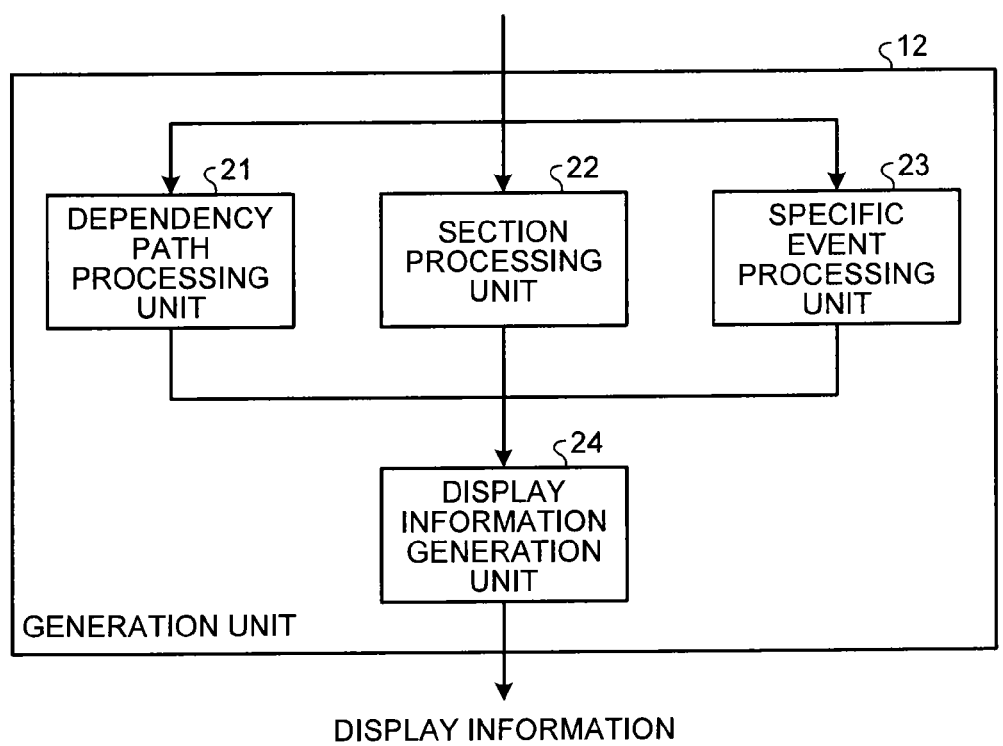
FIG. 9 is a block diagram illustrating a functional configuration of a generation unit.

FIG. 9 is a block diagram illustrating a functional configuration of the generation unit 12. The generation unit 12 includes a dependency path processing unit 21, a section processing unit 22, a specific event processing unit 23, and a display information generation unit 24. The generation unit 12 is configured by using the CPU 5, the ROM 6, the RAM 7, the input device 8 and the like of the information processing terminal 2 or the server 3.

The dependency path processing unit 21 determines a dependency path including a selected event selected by the user, on the basis of the dependency information 70, the selection information 80, and the like. The dependency path is a path formed of a plurality of events having dependency on one another. The dependency path including the selected event can be determined by, for example, determining a plurality of dependency paths from "1" to "22" on the basis of the dependency information 70 and thereafter extracting, from those paths, a dependency path including the selected event (such as "1" and "18") specified in the selection information 80.

The section processing unit 22 acquires information related to a section among the plurality of events having dependency, on the basis of the execution time information (the start time information 62 and the duration information 63), the dependency information 70, and the like. The information related to a section refers to a time interval between the end of an event executed first and the start of an event executed next regarding two events executed successively, for example. One can see for example that the event "3" is executed after completing the event "1" on the basis of the dependency information 70. One can then determine the end time (0+40=40) of the event "1" and the start time (60) of the event "3" on the basis of the execution time information to derive a time interval (20) from a difference between the start time and the end time. Moreover, one can detect a delay of the event by comparing the time interval determined in this manner with a time interval of an event actually executed and comparing the time specified in the start time information 62 with an actual start time of the event.

The specific event processing unit 23 determines the specific event matching the predetermined condition on the basis of the specific event information 90 or the like. As described above, the specific event is the event having the factor that inhibits smooth execution of a program, and includes the plurality of events temporally overlapping and executed in parallel as well as the event constituting the critical path, for example.

The display information generation unit 24 generates, on the basis of the processing result of each of the dependency path processing unit 21, the section processing unit 22, and the specific event processing unit 23, a piece of display information used to generate the display image 100 visually representing the execution state of the program. The display information generation unit 24 generates the display information such that the dependency path including the selected event, a predetermined section, and the specific event are displayed in a distinguishable manner, or displayed while characterized to make them readily recognized by sight, as described later.

The display control unit 13 generates the display image 100 on the basis of the display information generated by the generation unit 12 (the display information generation unit 24) and causes the output device 9 (such as the display of the information processing terminal 2) to display the display image 100. The display control unit 13 is configured by using the CPU 5, the ROM 6, the RAM 7, the output device 9 and the like of the information processing terminal 2 and the server 3.

Figure 10:
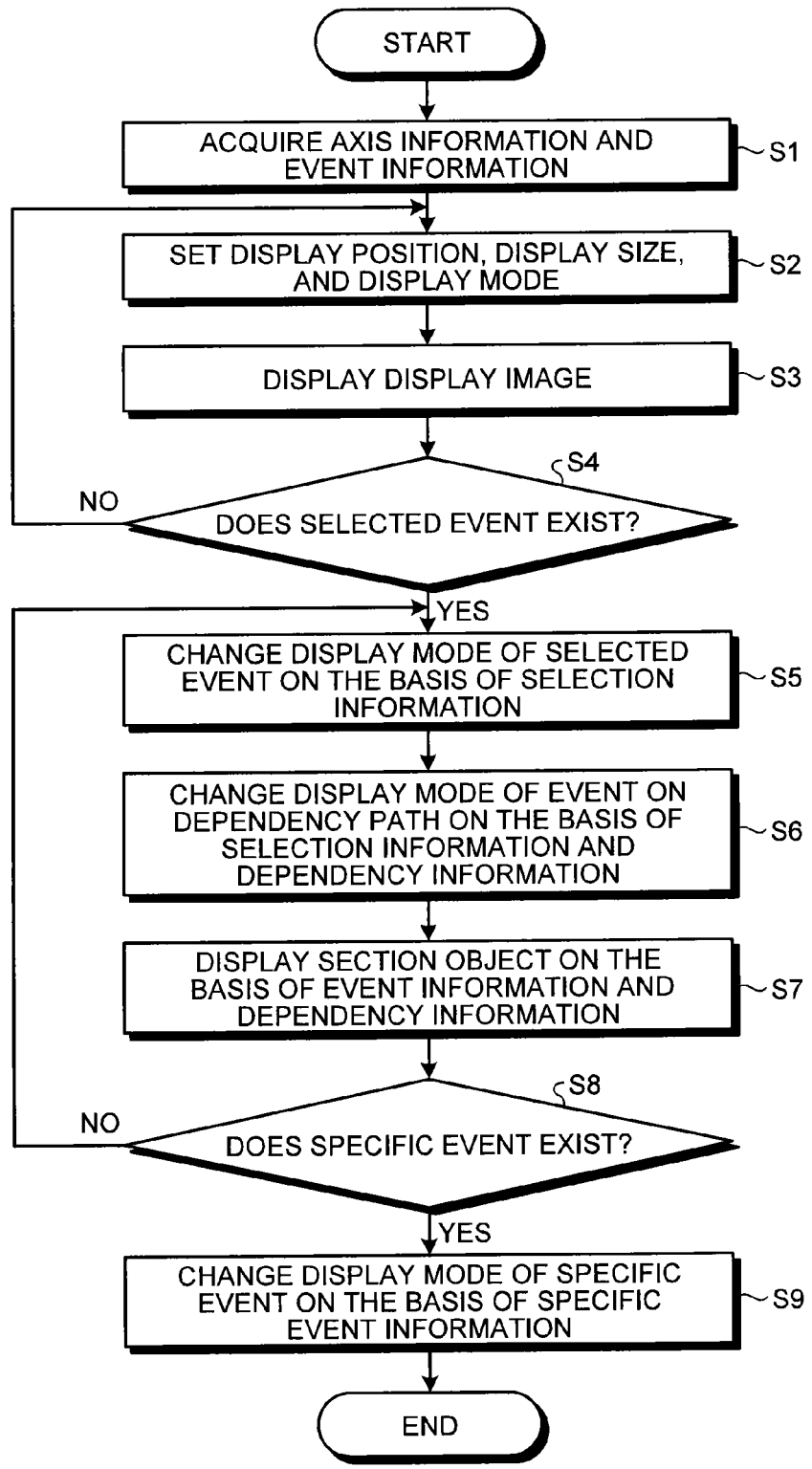
FIG. 10 is a flowchart illustrating processing performed in the program information generating system.

There will now be illustrated the processing of generating the display image 100 by the program information generating system 1 having the aforementioned configuration. FIG. 10 is a flowchart illustrating the processing performed in the program information generating system 1. FIGS. 11 to 19 are diagrams illustrating the display image 100.

As illustrated in FIG. 10, the axis information 50 and the event information 60 are acquired first (S1). On the basis of the axis information 50 and the event information 60, the display information is generated to set a display position, a display size and a display mode of each element configuring the display image 100 (S2). The display image 100 is generated on the basis of the display information and then displayed in the output device 9 of the information processing terminal 2 (S3).

Figure 11:
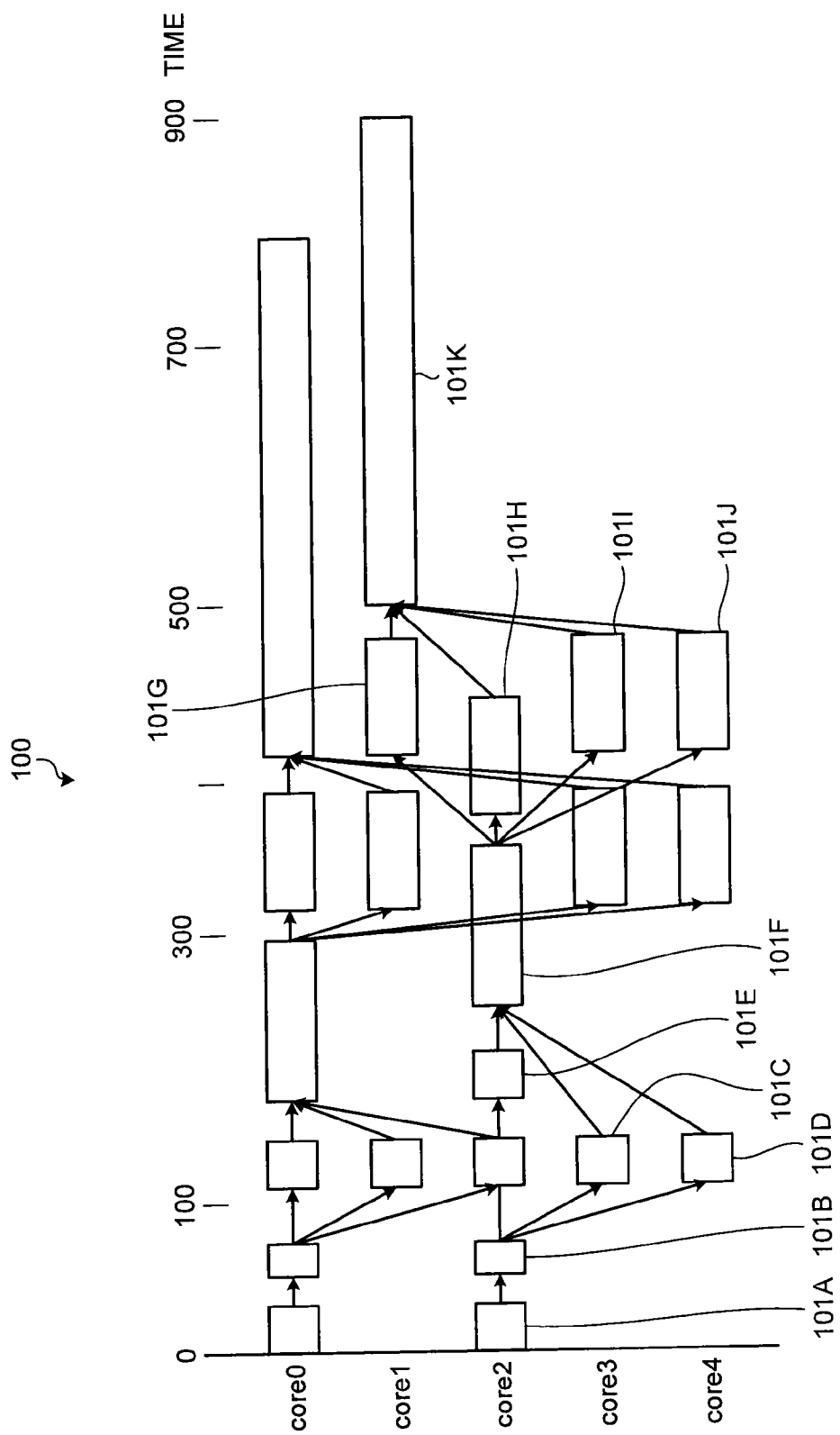
FIG. 11 is a diagram illustrating a display image in an initial state.

FIG. 11 illustrates the display image 100 in an initial state, the image being displayed in step S3. The display image 100 in the present example is a Gantt chart. The horizontal axis of the display image 100 is the time axis, and the vertical axis of the image is the attribute axis indicating the hardware or the like associated with an event. These time axis and attribute axis are set on the basis of the axis information 50 illustrated in FIG. 4 as described above.

The generation unit 12 generates a time axis object and an attribute axis object on the basis of the axis information 50 and the event information 60. In the present embodiment, the time axis object is generated by setting the duration per smallest rendering unit to "2" and the rendering range to "0" to "900" on the basis of the time axis information 51, and displaying a label of time information in every fixed section. The label of time information in the present example includes "100", "300", "500", "700", and "900". The generation unit 12 further generates the attribute axis object by setting the name of the attribute axis in the attribute axis information 52 as a label on the attribute axis and arranging the label on the basis of the display position information. The label "core0" is arranged at a display position "50", for example.

Rectangular event objects 101A, 101B, 101C and so forth (hereinafter noted as 101 when it is appropriate to express 101A, 101B, 101C and so forth collectively) are displayed in the display image 100. Each event object 101 corresponds one-to-one to an actual event in the present example. The position of the event object 101 on the vertical axis indicates which hardware the event is associated with. It is illustrated for example that an event corresponding to the event object 101A is executed by core2 while an event corresponding to an event object 101K is executed by core1. The position of the event object 101 on the horizontal axis indicates the execution time of the event. It is illustrated for example that the event corresponding to the event object 101K is started at time 500 and ends at time 900.

The generation unit 12 sets the display position and the display size of the event object 101 on the basis of the axis information 50 and the event information 60. Description will be given while focusing on the event object 101A corresponding to "2" of the identification information 61 as an example. The generation unit 12 sets the display size (length in the horizontal direction) of the event object 101A to (execution period: 40)/(duration per smallest rendering unit: 2)=20 on the basis of "40" being the duration information 63 corresponding to "2" in the identification information 61 and "2" being the duration per smallest rendering unit in the time axis information 51. The generation unit 12 further sets the start position (position at the left edge) of the event object 101A on the time axis to "0" on the basis of "0" being the start time information 62 corresponding to the identification information 61: 2 and "0, 900" being the time axis information 51. Moreover, the generation unit 12 sets the display position of the event object 101A in the attribute axis direction to "250" on the basis of "core2" being the attribute information 64 corresponding to "2" in the identification information 61 and "core2, 250" being the attribute axis information 52.

Note that the display position and display size of the event object 101 need only be determined such that the correspondence between the event object 101 and the axis element can be verified, and are thus not limited to what is described above. The display position and the display size may be determined on the basis of a value given beforehand or adjusted automatically on the basis of the attribute axis information 52 such that the axis elements do no overlap, for example. Moreover, the shape of the event object 101 is not limited to the rectangle but may be linear or elliptical.

An arrow drawn between the event objects 101 in FIG. 11 indicates the direction of dependency between the event objects 101. An arrow between the event objects 101A and 101B indicates that the event object 101B is executed after completing the event object 101A. Three arrows between the event objects 101C, 101D, 101E and the event object 101F indicate that the event object 101F is not executed until after the three event objects 101C, 101D, and 101E are completed.

Next, as illustrated in FIG. 10, it is determined whether a selected event exists (S4). When the selected event does not exist (No), the process returns to step S2 and, when the selected event exists (Yes), the display mode of the event object 101 corresponding to the selected event is changed on the basis of the selection information 80 (S5).

Figure 12:
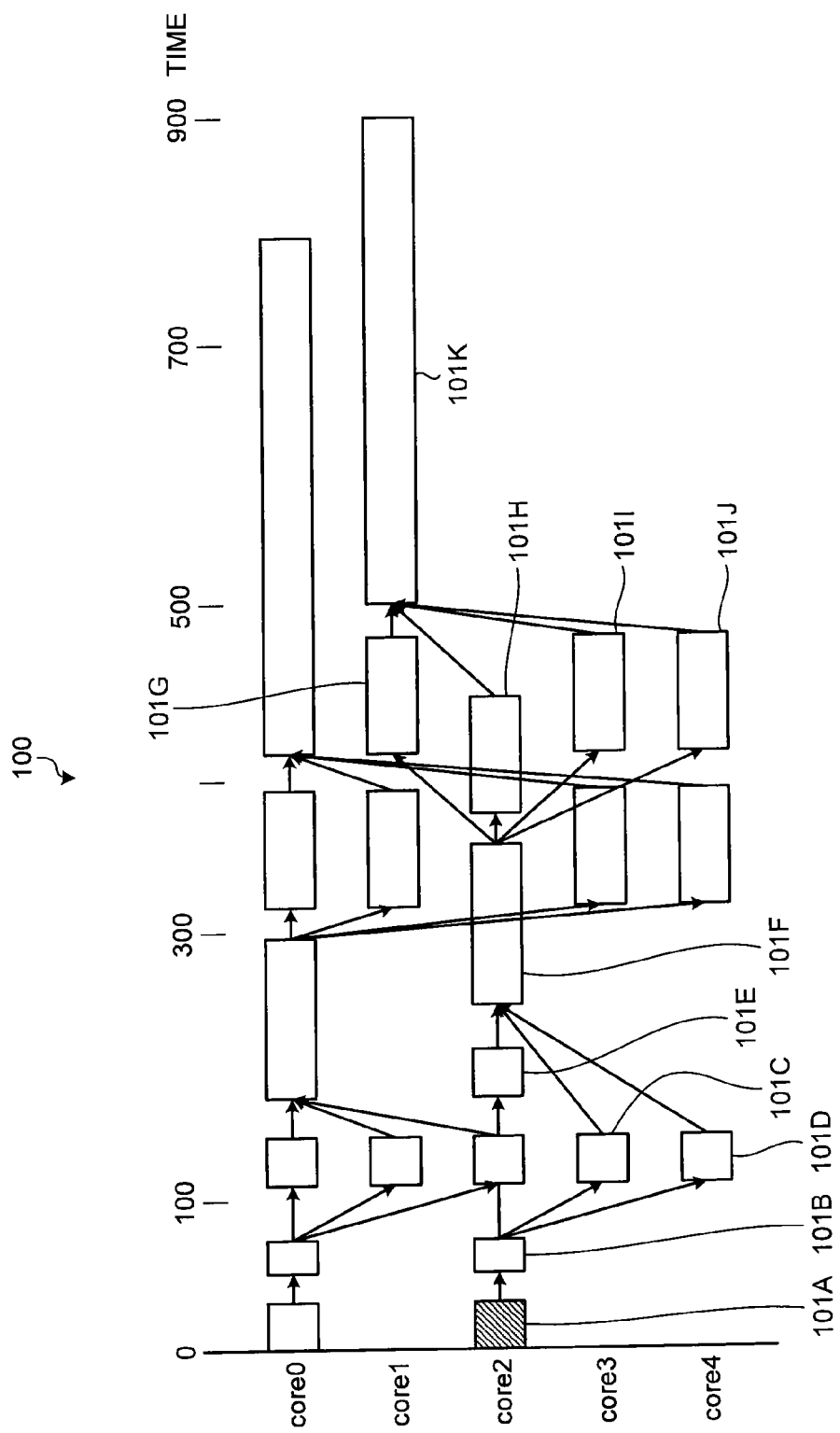
FIG. 12 is a diagram illustrating a display image where a display mode of an event object corresponding to a selected event is changed.

FIG. 12 illustrates a state where the display mode of the event object 101A corresponding to the selected event is changed. The event object 101A is displayed in the display mode different from that of the other event objects 101. The display mode includes the following, for example.

Color
Pattern
Brightness
Transparency
Shape
Flashing/non-flashing

The display mode is to be selected as appropriate according to a use state (whether or not the output device 9 supports color display, for example). The event can be selected by the designation operation performed on the screen by the user, as described above, whereas it may also be adapted to automatically select an event satisfying a preset condition, for example.

Next, as illustrated in FIG. 10, a dependency path including the event object 101 corresponding to the selected object is determined on the basis of the selection information 80 and the dependency information 70 so that the display mode of the event object 101 on the dependency path is changed (S6).

Figure 13:
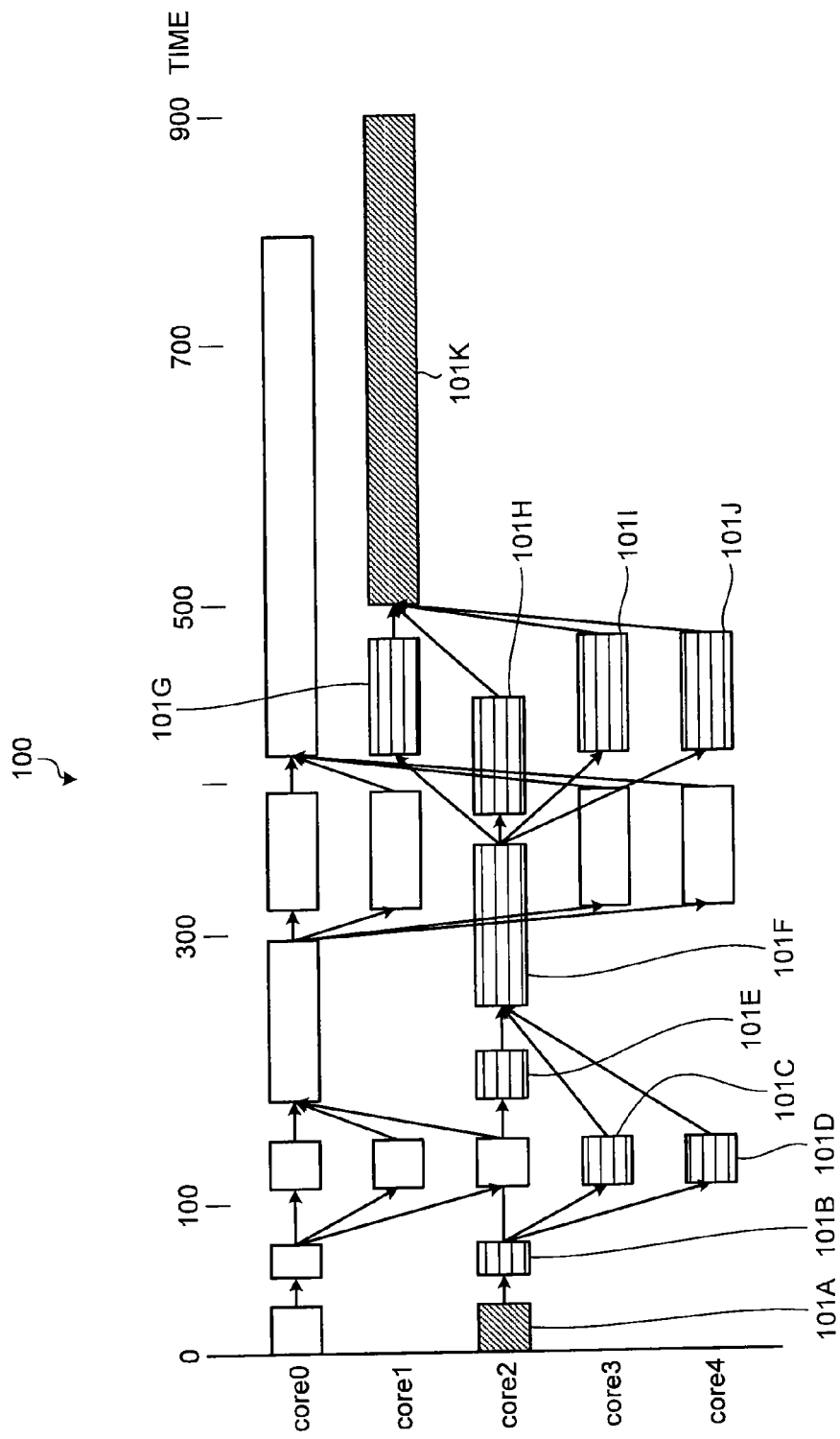
FIG. 13 is a diagram illustrating the display image when two event objects are selected.

FIG. 13 illustrates the display mode of the dependency path when two event objects 101A and 101K are selected. The dependency path is set to include the two event objects 101A and 101K selected. In the present example, the display mode of the other event objects 101B to 101J included in the dependency path is changed to differ from the display mode of the selected event objects 101A and 101K and another event object 101 not included in the dependency path.

Figure 14:
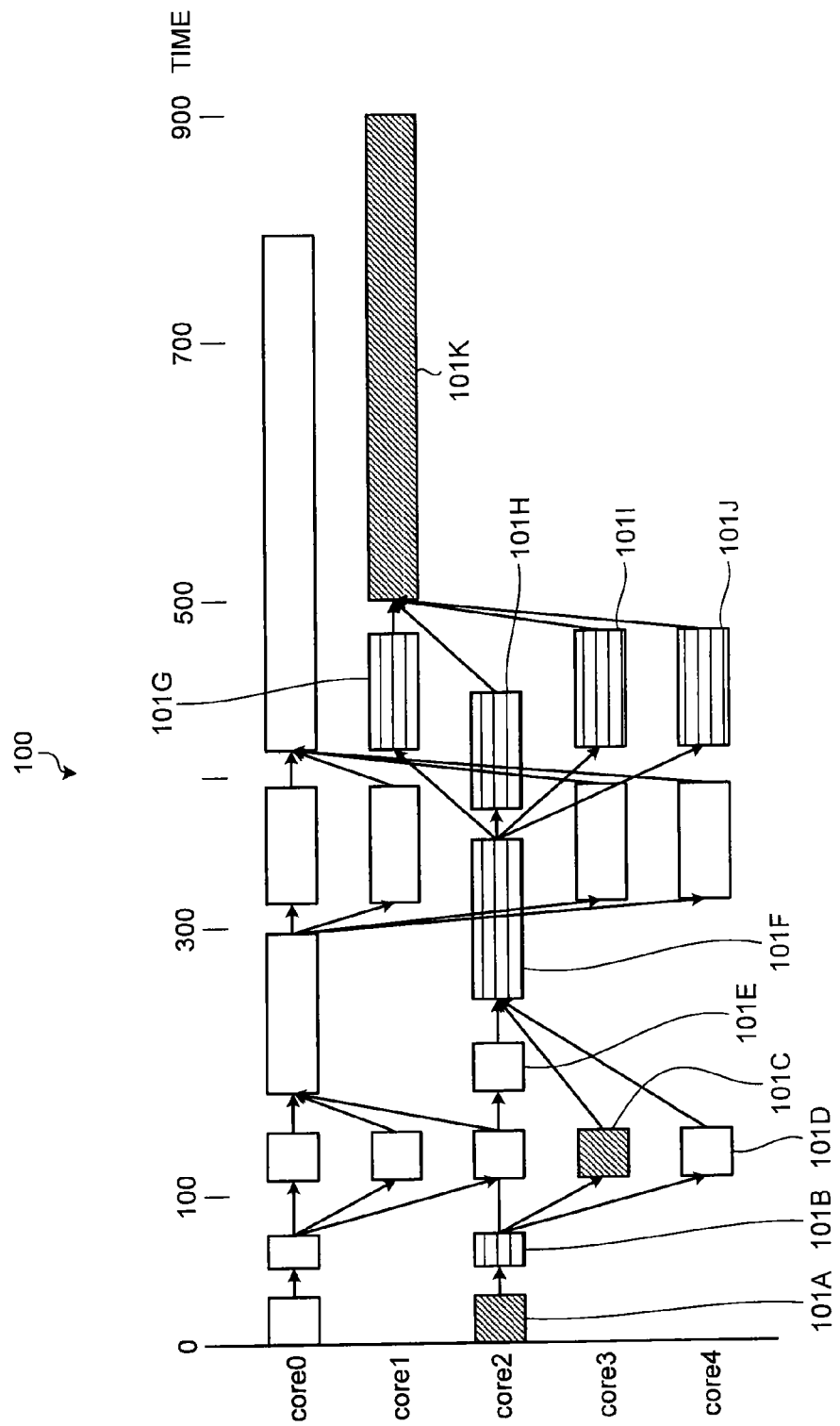
FIG. 14 is a diagram illustrating the display image when three event objects are selected.

FIG. 14 illustrates the display mode of the dependency path when three event objects 101A, 101C and 101K are selected. The present example illustrates a state where the event object 101C is additionally selected from the state illustrated in FIG. 13. Such additional selection can be performed by an operation of the user using the mouse or touch panel and specifying the event object 101C on the display of the information processing terminal 2, for example. The dependency path is set to include all the event objects 101A, 101C, and 101K being selected. In the present example, the event objects 101D and 101E are excluded from the dependency path as compared to the state illustrated in FIG. 13.

Figure 15:
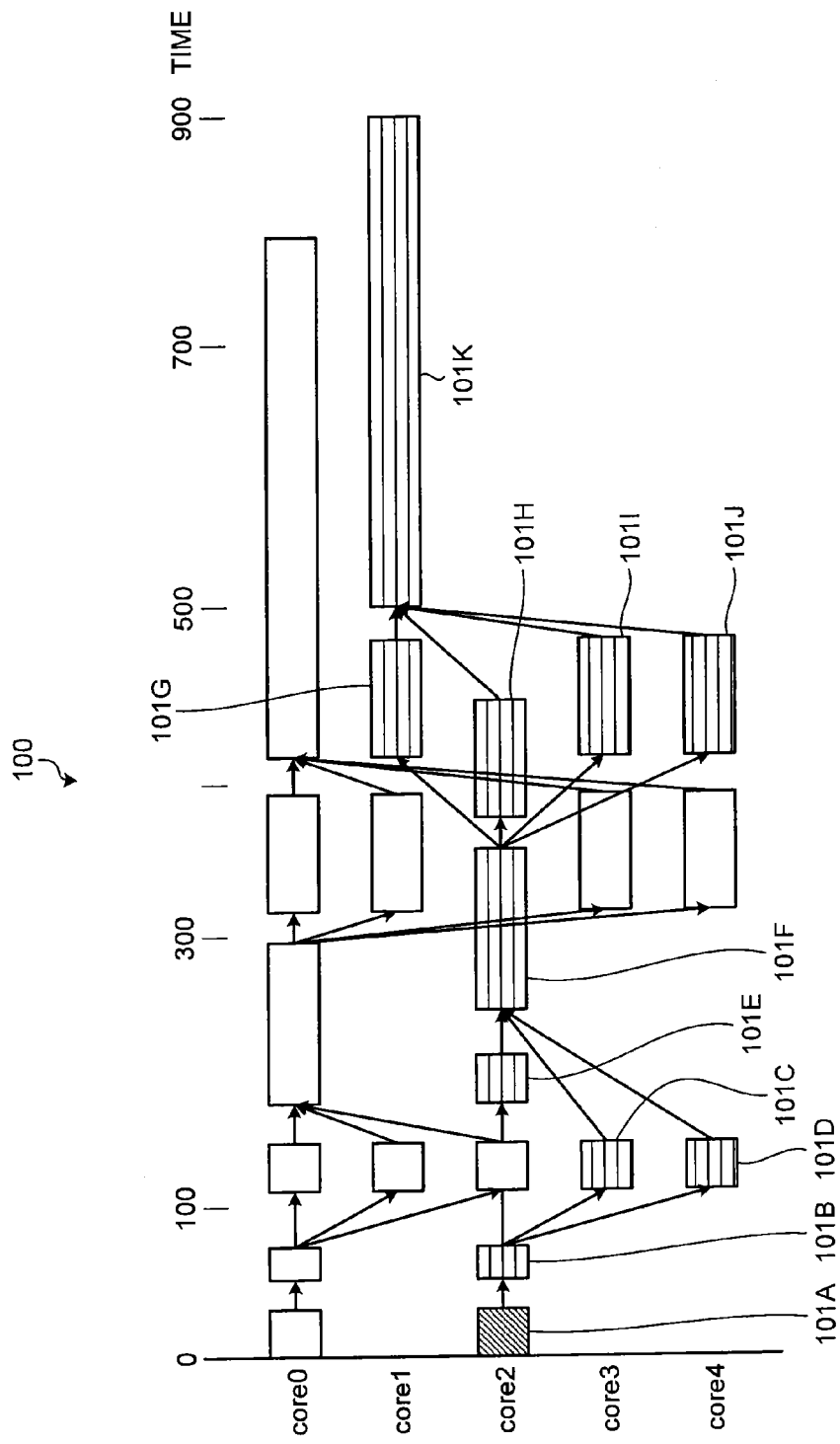
FIG. 15 is a diagram illustrating the display image when one event object is selected.

FIG. 15 illustrates the display mode of the dependency path when one event object 101A is selected. Only one event object 101A is selected in the present example. The display mode of the event object 101A is different from the display mode of the other event objects 101B to 101K constituting the dependency path. The dependency path can thus be characterized for display even when only one event object 101 is selected. Note that the present example illustrates a state where the selection of the event objects 101C and 101K is canceled from the state illustrated in FIG. 13 or 14. Such cancellation of selection is preferably performed by the user on the display as with the addition of selection described above.

Next, as illustrated in FIG. 10, the section object is displayed on the basis of the event information 60 and the dependency information 70 (S7). The section object indicates the state of a section among the plurality of event objects 101 having the dependency. The section object is set according to a time interval between two event objects 101 executed successively, a delay of the event object 101, and the like. The section object corresponding to a section (loss section) preceding an event which is delayed may be displayed in a display mode different from that of another section object, for example. It is thought that a phenomenon inhibiting smooth execution of a program is occurring in the loss section.

Figure 16:
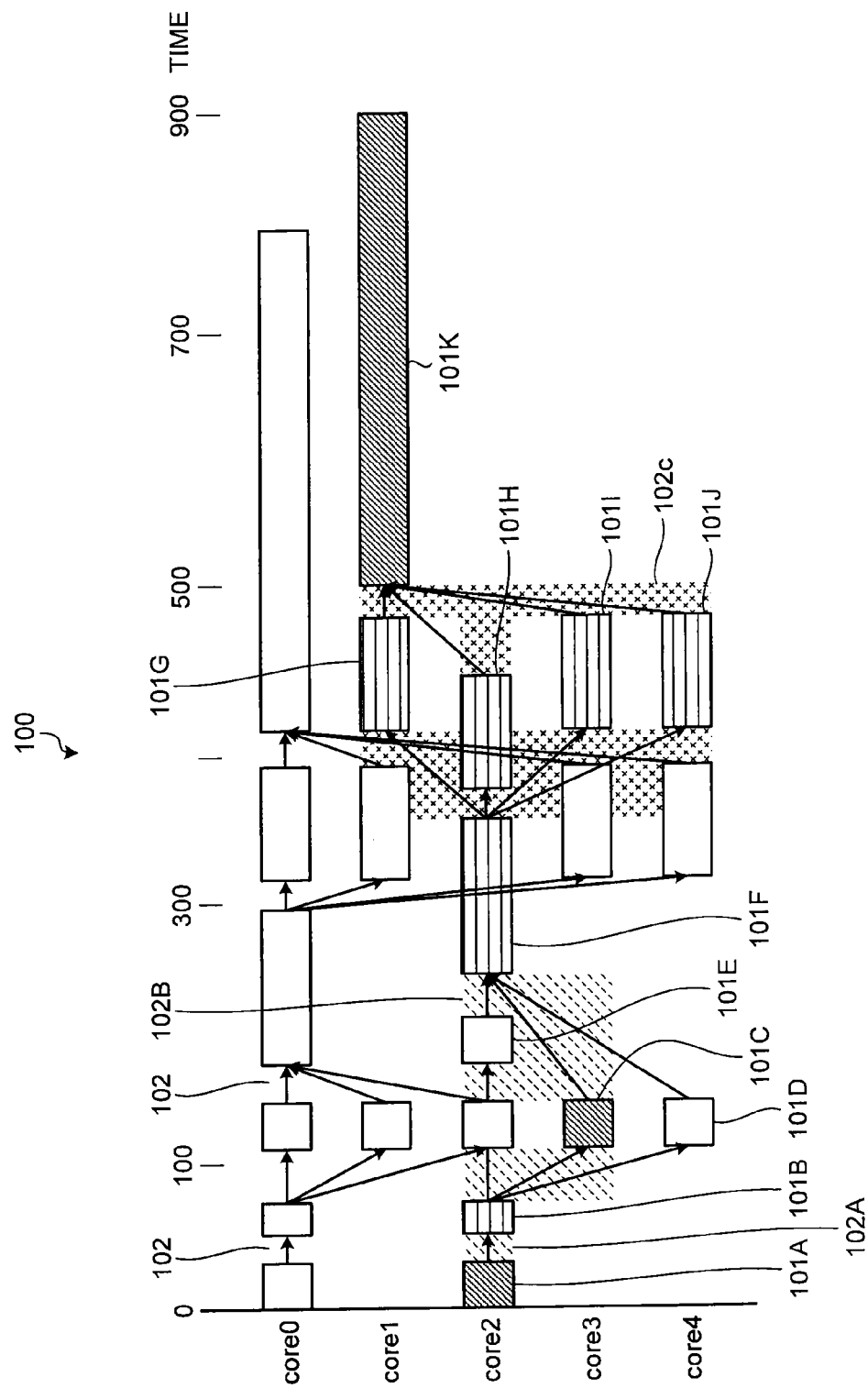
FIG. 16 is a diagram illustrating the display image where a section object corresponding to a loss section is displayed.

FIG. 16 illustrates a state where section objects 102A, 102B, and 102C corresponding to the loss section are displayed. A section object 102 indicated with a blank space indicates a normal section other than the loss section. In the present example, the section object 102A between the event object 101A and the event object 101B, the section object 102B between the event object 101B and the event object 101F, the section object 102C between the event object 101H and the event object 101K and the like correspond to the loss section. The display mode of the section objects 102A, 102B, and 102C corresponding to the loss section is different from the display mode of the other section object 102. Moreover, in the present example, the display mode of the section objects 102A and 102B being a portion of the section objects corresponding to the loss section is different from the display mode of the section object 102C being another portion of the section objects corresponding to the loss section. Accordingly, the section objects 102A, 102B, and 102C corresponding to the loss section may be displayed in the different display modes according to the overlap of the dependency and the length of the delay time, for example.

The generation unit 12 determines the display position, display size, and display mode of the section objects 102, 102A, 102B, and 102C on the basis of the event information 60 and the dependency information 70. Description will be given while focusing on the section object 102A as an example. A start position (position at the left edge) of the section object 102A corresponds to an end position of the event object 101A immediately preceding the section object 102A. The end position of the event object 101A is {(start time: 0 corresponding to the identification information 61: 1)+(execution time: 40)}/(duration per smallest rendering:

2)=20. That is, the display position of the section object 102A is set such that the start position of the object is set to the position corresponding to "20" on the horizontal axis (time axis) (the position on the vertical axis (attribute axis) is identical to that of the event object 101A). The display size of the section object 102A is the length measured from the end position of the event object 101A to a start position of the event object 101B. The start position of the event object 101B is (start time: 60 corresponding to the identification information 61: 4)/(duration per smallest rendering: 2)=30. Therefore, the display size of the section object 102A is set to {(the start position of the event object 101B: 30)−(the end position of the event object 101A: 20)}=10. When the actual start time of the event object 101B is later than time: 60 specified in the start time information 62, the generation unit 12 acknowledges the section object 102A as a loss section and sets the display mode of that section object to differ from the display mode of the other section object 102 It may also be adapted that, when the delay time of the event object 101B is shorter than or equal to a predetermined value, the generation unit does not acknowledge the section object 102A as the loss section and does not change the display mode of that section object. As a result, only the delay having a substantial effect can be displayed in a distinguishable manner. The other section objects 102, 102B, and 102C can be set in the similar manner.

Moreover, the section objects 102B and 102C located among the plurality of event objects 101 may result in a state where a plurality of dependencies overlaps. In such case, the display mode of the single section object 102A may be set differently from the display mode of the overlapping section objects 102B and 102C. It may be adapted, for example, to set the display mode of the single section object 102A to a "red rectangle with the transparency equal to 50%" and the display mode of the overlapping section objects 102B and 102C to an "yellow rectangle with the transparency equal to 50%". The partially overlapping section objects 102B and 102C can thus be displayed in the distinguishable manner.

Note that the display position and display size of the section objects 102, 102A, 102B, and 102C need only be determined such that the two event objects 101 involved can be verified, and are thus not limited to what is described above. The display position and the display size may be determined on the basis of a value given beforehand or adjusted automatically such that the section objects are brought into contact with the two event objects 101 involved, for example. Moreover, the shape of the section objects 102, 102A, 102B, and 102C is not limited to the rectangle but may be linear or elliptical.

Next, as illustrated in FIG. 10, it is determined whether a specific event exists (S8). When the specific event does not exist (No), the process returns to step S5 and, when the specific event exists (Yes), the display mode of the event object 101 corresponding to the specific event is changed on the basis of the specific event information 90 (S9).

Figure 17:
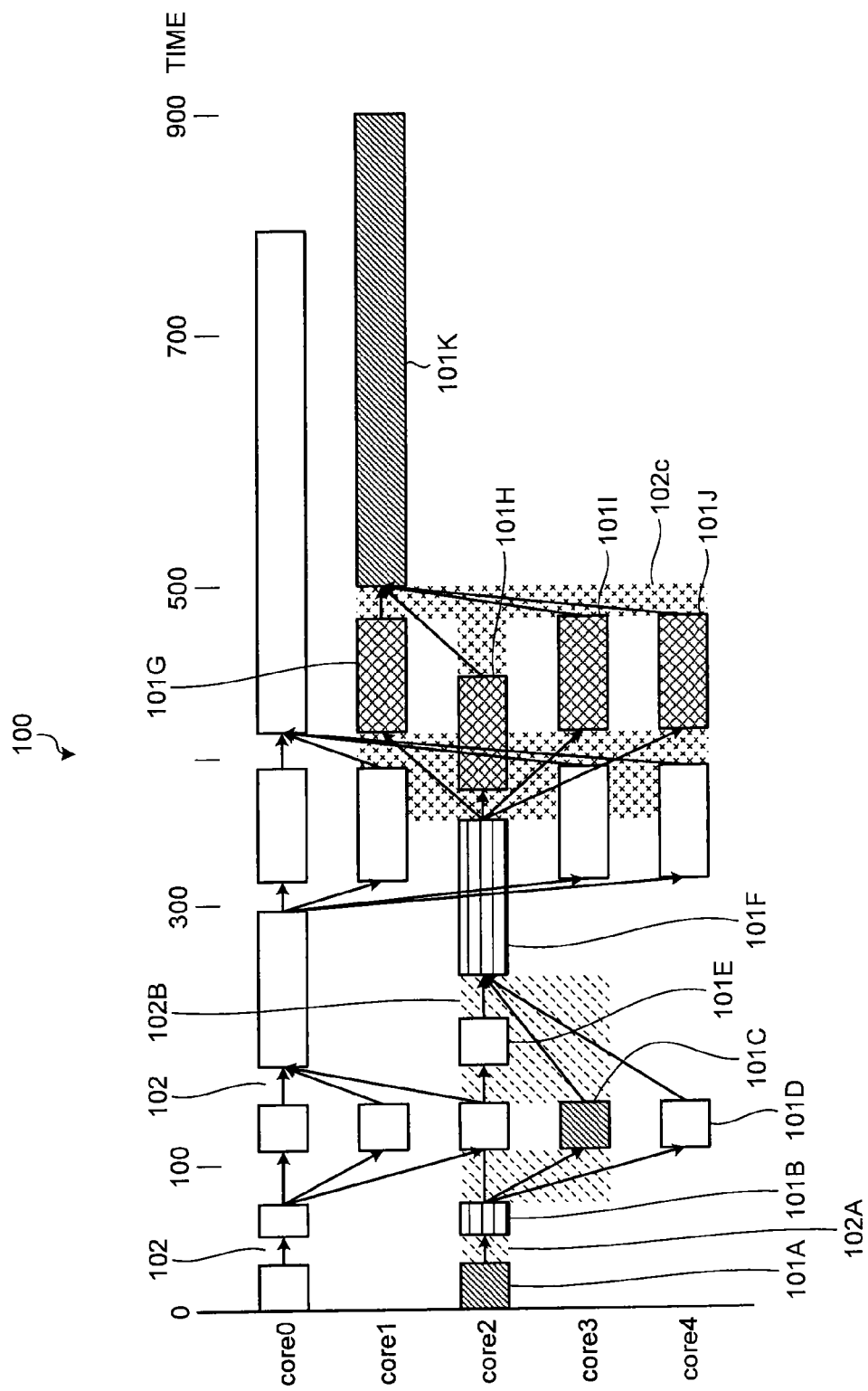
FIG. 17 is a diagram illustrating the display image when a display mode of an event object corresponding to a specific event executed in parallel is changed.

FIG. 17 illustrates a state where the display mode of the event objects 101G, 101H, 101I, and 101J corresponding to the specific event executed in parallel is changed. In the present example, the display mode of the four event objects 101G, 101H, 101I, and 101J executed in parallel is different from the display mode of the other event objects 101A, 101B, 101C, 101F, and 101K included in the dependency path.

FIG. 18 illustrates a state where the display mode of the event objects 101A, 101B, 101E, 101F, 101H, and 101K corresponding to the specific event constituting the critical path is changed. In the present example, the display mode of the six event objects 101A, 101B, 101E, 101F, 101H, and 101K included in the critical path is different from the display mode of the other event objects 101C, 101D, 101G, 101I, and 101J included in the dependency path.

FIG. 19 illustrates a state where two event objects 101L and 101M not included in the dependency path that is already set are newly selected. A new dependency path including the event objects 101L and 101M is set in the present example. As indicated with vertical stripes in the figure, the event object 101 included in the new dependency path is displayed in the display mode different from the display mode used by the dependency path that is already set (dependency path including the event objects 101A, 101C, and 101K). As a result, the state of each dependency path can be displayed in a distinguishable manner.

Note that while FIG. 1 illustrates the configuration where the information processing terminal 2 and the server 3 are connected through the network 4, the embodiment of the program information generating system 1 is not limited to such configuration. The acquisition unit 11, the generation unit 12, and the display control unit 13 described above can be realized by a stand-alone computer, for example. That is, the term "system" implies a stand-alone information processing apparatus as well. The acquisition unit 11, the generation unit 12, and the display control unit 13 described above can also be realized by connecting a plurality of computers to an intranet.

While FIG. 3 illustrates the configuration where the acquisition unit 11, the generation unit 12, and the display control unit 13 which are the most basic functional block of the program information generating system 1 are connected in the order of processing, the embodiment is not limited to such configuration. There may be provided, for example, a configuration where each functional block is operated in parallel while cooperating with each other, a configuration where the order of the functional blocks is changed, a configuration where one functional block is divided into a plurality of functional blocks, or a configuration where these three configurations are combined.

The control program realizing the function of the program information generating system 1 can be provided while recorded in a computer-readable recording medium such as a CD-ROM, a flexible disk (FD), a CD-R, a DVD and the like in an installable or executable file format. Moreover, the control program may be provided while downloaded from a predetermined storage device connected to a network to a predetermined computer, or provided to a predetermined information processing apparatus while incorporated beforehand into the ROM or the like. The control program may also be configured by a plurality of modules realizing the function of the acquisition unit 11, the generation unit 12, and the display control unit 13 described above.

Furthermore, each function of the acquisition unit 11, the generation unit 12, and the display control unit 13 may be realized when the control program is executed by the CPU 5, realized by the action of hardware such as an IC (Integrated Circuit), or realized by the combination of these.

According to the program information generating system 1 of the first embodiment, the dependency path including the event selected by the user is displayed in the display mode different from that of another event. As a result, when the user selects on the screen an event estimated to be the factor of a trouble occurring in the program, for example, a dependency path associated with the event is displayed in a distinguishable manner. The user can thus more easily acquire information to improve the program. Moreover, the display mode of the dependency path is changed in this manner so that a desired dependency path can be accurately recognized by sight even when a large number of events are generated by executing the program.

Furthermore, the section between the events constituting the dependency path is displayed in the distinguishable manner as described above so that the visibility can be further improved. As described above, for example, a site to be improved can be accurately and easily recognized by characterizing the section preceding the event which is delayed and then displaying the section.

Furthermore, the specific event matching the predetermined condition is displayed in the distinguishable manner as described above so that the visibility can be further improved. As described above, for example, a site to be improved can be accurately and easily recognized by first characterizing the plurality of events processed in parallel or the event constituting the critical path and then displaying the event (s).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A program information generating system comprising:
a processor;
a memory;
an acquisition unit that is executed by the processor, and acquires dependency information indicating dependency among a plurality of events generated by execution of a program and selection information identifying a selected event that is the event selected by a user;
a generation unit that is executed by the processor, and generates display information such that a dependency path is displayed, on the basis of the dependency information and the selection information, the dependency path including the selected event and one or more of the plurality of events having the dependency of the selected event; and
a display control unit that is executed by the processor, and controls a display unit, on the basis of the display information, such that a display image indicating an execution state of the program is displayed, wherein
the generation unit generates the display information such that a display mode of an event object that corresponds to the events included in the dependency path differs from a display mode of the event object that corresponds to the events not included in the dependency path.

2. The system according to claim 1, wherein
the acquisition unit further acquires execution time information related to an execution time of the event, and
the generation unit generates a section object corresponding to a section among the plurality of event objects on the basis of the execution time information.

3. The system according to claim 2, wherein
the generation unit determines the event that is delayed by comparing a time specified in the execution time information with an execution time of the event actually executed, and generates the display information such that the section object positioned in front of the event object corresponding to the event that is delayed is displayed in a distinguishable manner.

4. The system according to claim 1, wherein
the acquisition unit further acquires specific event information identifying a specific event that is the event matching a predetermined condition, and
the generation unit generates the display information such that the event object corresponding to the specific event is displayed in a distinguishable manner.

5. The system according to claim 4, wherein
the specific event is the plurality of events executed in parallel.

6. The system according to claim 4, wherein
the specific event is the event constituting a critical path.

7. The system according to claim 1, wherein
the dependency path includes at least two of the selected event.

8. The system according to claim 1, comprising: an information processing terminal used by the user; and a server connected to the information processing terminal through a network, wherein
at least a part of processing to generate the display information is performed by the server, and
the display image is displayed in the display unit of the information processing terminal.

9. The system according to claim 1, wherein
the generation unit changes at least one of color, pattern, brightness, transparency, shape, or flashing/non-flashing of the event object to make the display mode of the event object included in the dependency path different from the display mode of the event object not included in the dependency path.

10. The system according to claim 1, wherein the event object is a graphical indicator.

11. The system according to claim 1, wherein the event is a unit of processing generated by executing the program.

12. The system according to claim 1, wherein the dependency indicates the order of execution of the plurality of events.

13. A program information generating method that generates information indicating an execution state of a program by using a computer, the method comprising:
acquiring dependency information indicating dependency among a plurality of events generated by execution of a program and selection information identifying a selected event that is the event selected by a user;
generating display information, on the basis of the dependency information and the selection information, such that a dependency path that is formed of the plurality of events having the dependency and includes the selected event is displayed in a distinguishable manner;
controlling a display unit, on the basis of the display information, such that a display image indicating an execution state of the program is displayed;
generating an event object that corresponds to the event; and
generating the display information such that a display mode of the event object included in the dependency path differs from a display mode of the event object not included in the dependency path.

14. The method according to claim 13, wherein the event object is a graphical indicator.

15. The method according to claim 13, wherein the event is a unit of processing generated by executing the program.

16. The method according to claim 13, wherein the dependency indicates the order of execution of the plurality of events.

17. A computer program product comprising a non-transitory computer-readable medium storing a program that causes a computer to execute processing of:
  acquiring dependency information indicating dependency among a plurality of events generated by execution of a program and selection information identifying a selected event that is the event selected by a user;
  generating display information, on the basis of the dependency information and the selection information, such that a dependency path that is formed of the plurality of events having the dependency and includes the selected event is displayed in a distinguishable manner;
  controlling a display unit, on the basis of the display information, such that a display image indicating an execution state of the program is displayed;
  generating an event object that corresponds to the event; and
  generating the display information such that a display mode of the event object included in the dependency path differs from a display mode of the event object not included in the dependency path.

18. The computer program product according to claim 17, wherein the event object is a graphical indicator.

19. The computer program product according to claim 17, wherein the event is a unit of processing generated by executing the program.

20. The computer program product according to claim 17, wherein the dependency indicates the order of execution of the plurality of events.

\* \* \* \* \*